(12) United States Patent
Kurigata

(10) Patent No.: US 8,270,737 B2
(45) Date of Patent: Sep. 18, 2012

(54) IMAGE PROCESSING APPARATUS

(75) Inventor: Yuhei Kurigata, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 968 days.

(21) Appl. No.: 12/276,517

(22) Filed: Nov. 24, 2008

(65) Prior Publication Data

US 2009/0148055 A1  Jun. 11, 2009

(30) Foreign Application Priority Data

Dec. 5, 2007  (JP) ................................. 2007-314274

(51) Int. Cl.
*G06K 9/46* (2006.01)

(52) U.S. Cl. ........ 382/235; 382/232; 382/277; 382/296; 382/289; 358/474; 358/488; 358/496; 358/497

(58) Field of Classification Search .................. 382/232, 382/235, 277, 296, 289, 100; 358/474, 488, 358/496, 497; 315/383, 364; 347/224, 225, 347/237, 233

See application file for complete search history.

(56) References Cited

U.S. PATENT DOCUMENTS

| 6,807,320 B1* | 10/2004 | Sawada ......................... 382/289 |
| 2002/0047658 A1* | 4/2002 | Nakanishi et al. ............ 315/364 |
| 2004/0067085 A1* | 4/2004 | Uemura ..................... 400/118.2 |

FOREIGN PATENT DOCUMENTS

JP  2006-203710 A  8/2006

* cited by examiner

*Primary Examiner* — Ali Bayat

(74) *Attorney, Agent, or Firm* — Holtz, Holtz, Goodman & Chick, PC

(57) ABSTRACT

An image processing apparatus for correcting a dislocation of image, pixels being arranged in a first and second directions perpendicular to each other, including: a section which breaks down a correction amount of the image of each pixel in the second direction into a first shift amount with a unit of a prescribed block, a second shift amount with a unit of the pixel, and a third shift amount less than the pixel size; a minimal shift section which shifts the image data by the third shift amount; a pixel unit shift section which shifts the image data by the second shift amount; and a block unit shift section which shifts the image data by the first shift amount, during compression and storage processing of the image data in the block unit, and executing arrangement of the image data after reading-out and expanding the compressed image data.

10 Claims, 15 Drawing Sheets

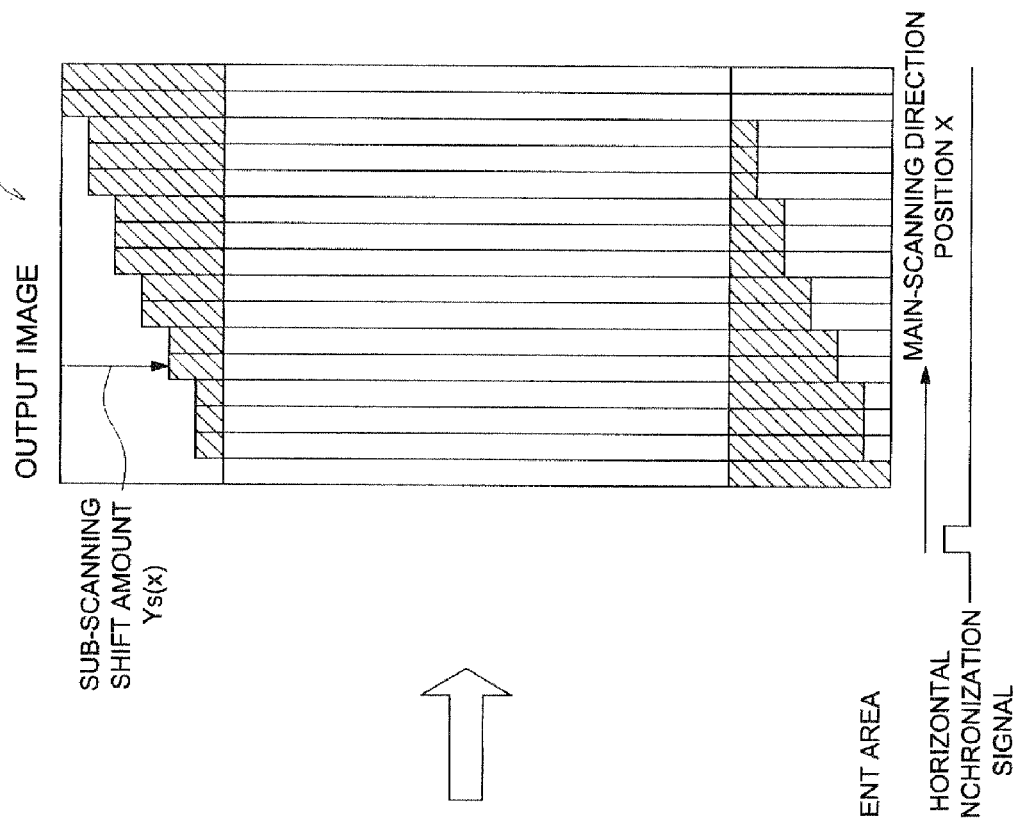
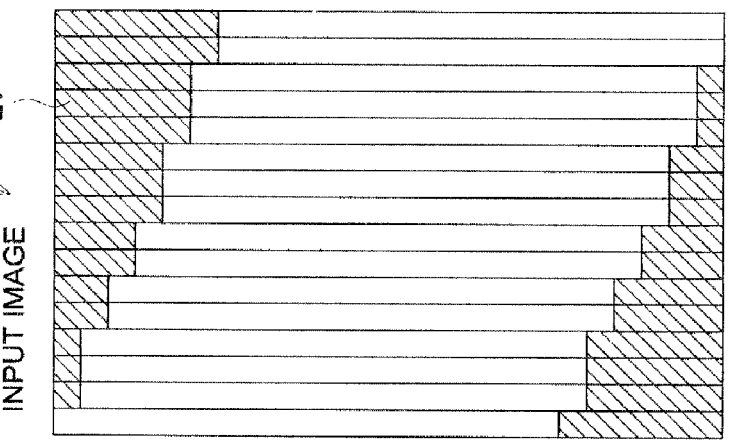
FIG. 3(a) INPUT IMAGE
FIG. 3(b) OUTPUT IMAGE

FIG. 5

IMAGE DATA

LINE (-2): 2 LINES AFTER

LINE (-1): 1 LINE AFTER

LINE (0): TARGET LINE

LINE (+1): 1 LINE BEFORE

FIG. 7 (a)
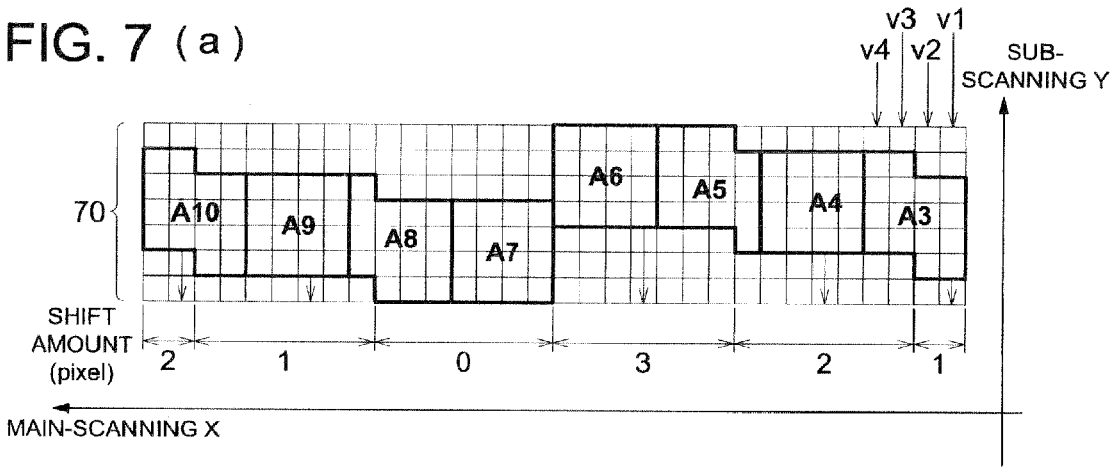
FIG. 7 (b) ↓ PIXEL UNIT SHIFT
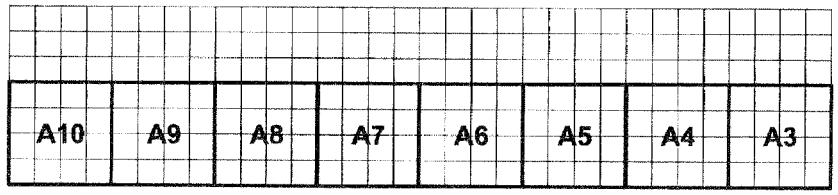
FIG. 7 (c) ↓ BTC COMPRESSION
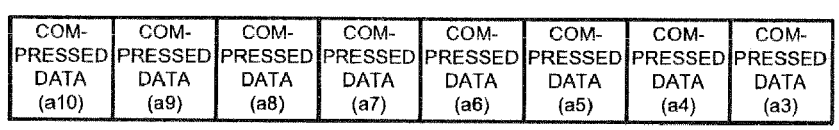
FIG. 7 (d) ↓ BLOCK UNIT SHIFT
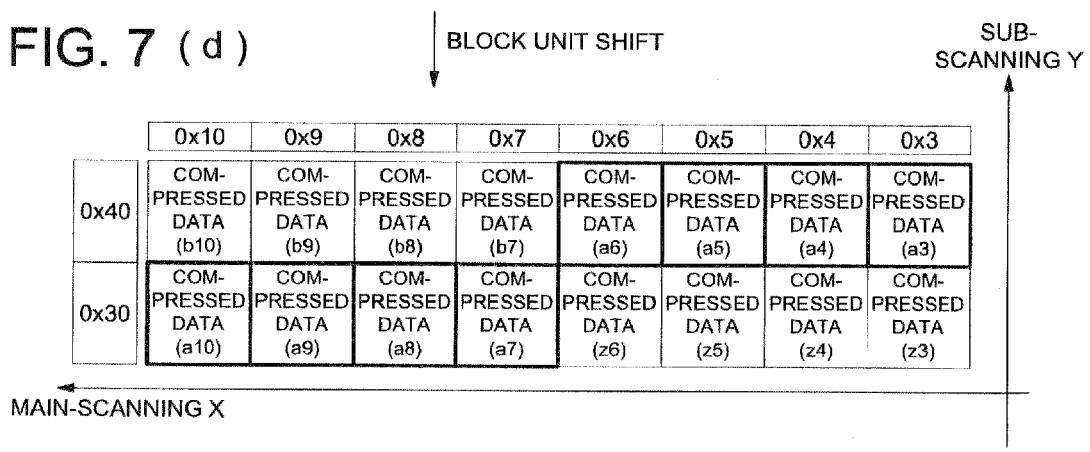

FIG. 8 (b)

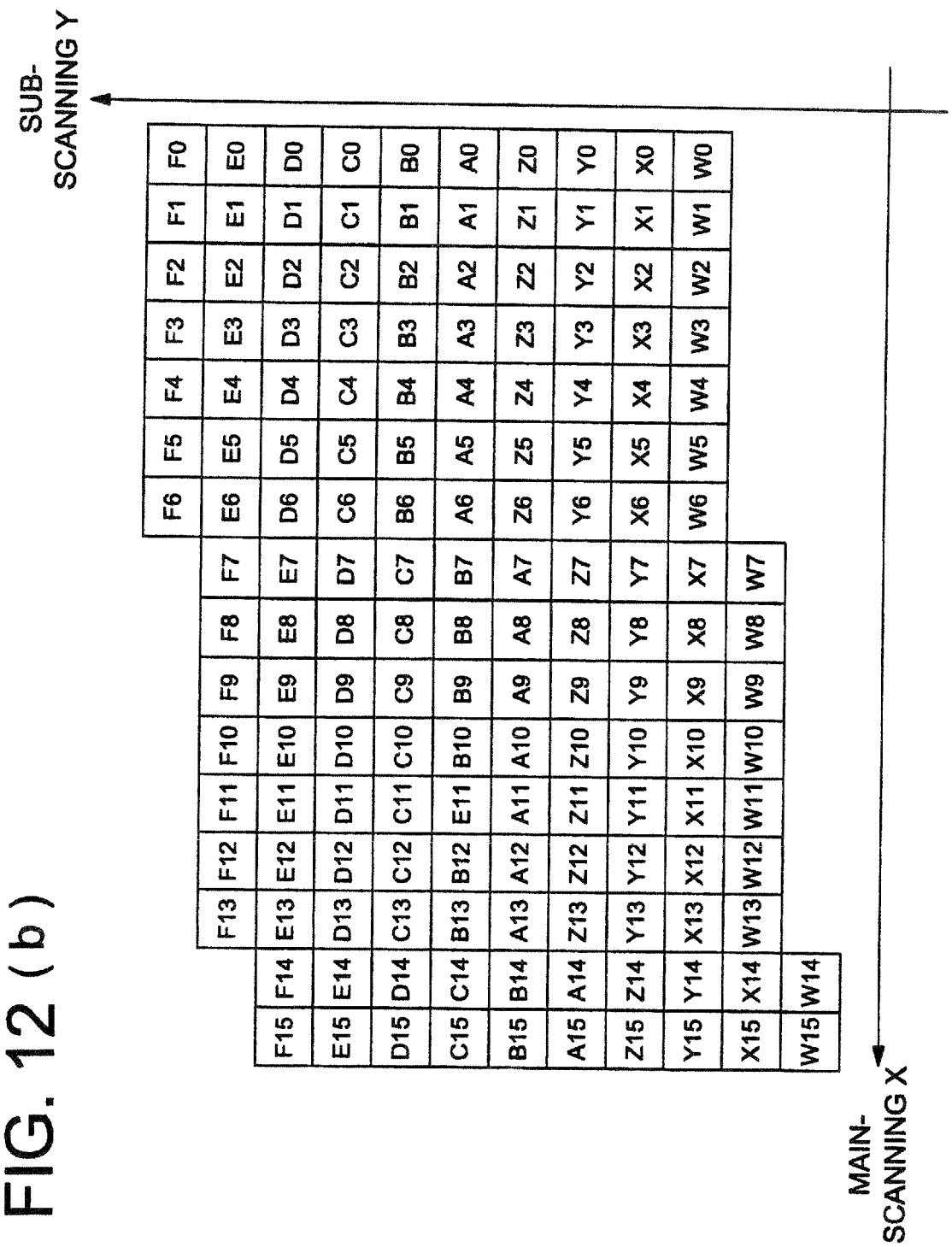

FIG. 13 (a)
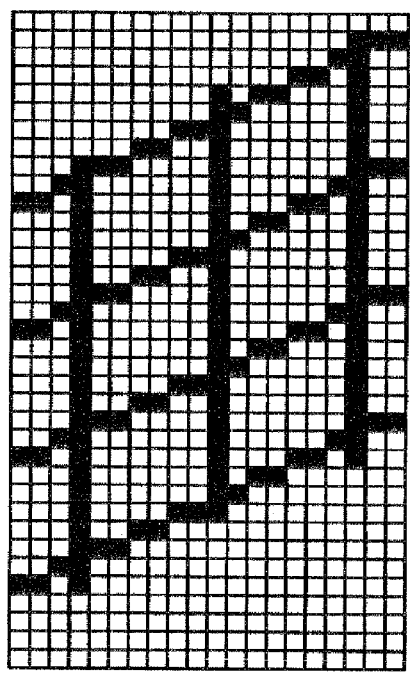
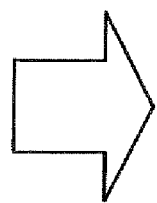
FIG. 13 (b)
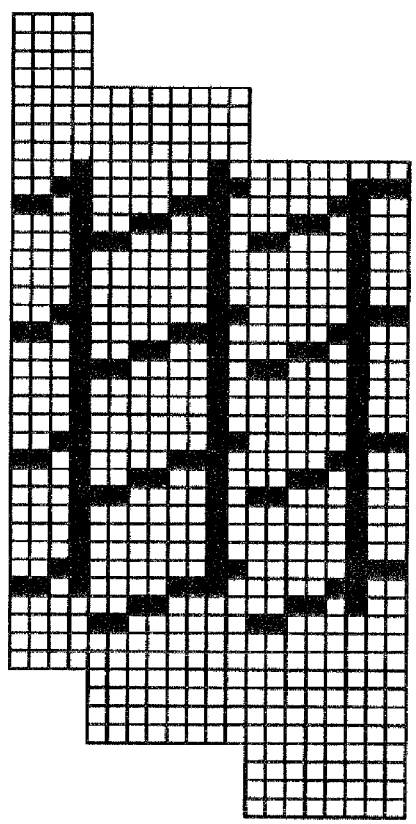

IMAGE PROCESSING APPARATUS

CROSS REFERENCE TO RELATED APPLICATION

The present application is based on Japanese Patent Application No. 2007-314274 filed with Japanese Patent Office on Dec. 5, 2007, the entire content of which is hereby incorporated by reference.

BACKGROUND OF THE INVENTION

1. Field of Technology

The present invention relates to an image forming apparatus which corrects image distortion caused by skew of a line image sensor, inclination of an original document, and the like.

2. Description of Prior Art

In an apparatus such as a digital copier, the original document is read out in two-dimensions by repeating each line reading-out with the line image sensor, while the original document is moved in a perpendicular direction (sub-scanning direction Y) to the direction of reading-out with the line image sensor (namely main-scanning direction X). In such apparatus, in cases where the reading-out direction (main-scanning direction) and the sub-scanning direction are not aligned in a perpendicular relation (namely being skewing) to each other, a rectangular original document is read out with being distorted into parallelogram (F1 in the drawing) as shown in FIG. 6(a) for example. In the case of electronically correcting such image distortion or inclination, or in the case of correcting the image F1 in FIG. 6(a), into the image F2 in FIG. 6(b), at least the correction of skew (dislocation) in the sub-scanning direction is necessary. In order to execute this skew correction in real time by simultaneously keeping pace with the reading operation of the original document, usually, line memories corresponding to a correction amount A (shaded area in FIG. 6(a)) are necessary. For example, to cope with a distortion of approximately 10 mm (corresponding to 216 lines), memory for 108 lines is required (since shaded area A is a triangle, half of 216 are required).

Meanwhile, in the apparatus such as a digital copier, a system is adopted where the image data obtained by reading-out from an original document is once stored in the memory, and after reading-out from the memory, the image data is applied a certain image processing to output the image. Since the data amount of the image data is very large, for example 200 mega bytes for one page of A3 size original document, such image data is usually compressed and stored in the memory. In a compression system, such as BCT compression where the image data is divided into blocks of 4×4, for example, and compressed by a unit of the block, and JPEG compression are utilized. There is a technology to conduct an image rotation processing by devising the arrangement of the image of each block, in the operation of reading-out and writing-in of image data.

Further, there is a technology where the image data stored in the memory is divided into a block unit having the size and the shape in accordance with the angle of image inclination, and the relative position of each block is shifted by the unit of a pixel, and rearranged on the memory, thus the inclination of the image is corrected. According to this technology in the case of performing the compression and expansion by the unit of block, the above rearrangement is executed (refer to JPA2006-203710 for example).

In the case where the technology of image rotation by changing the arrangement of blocks is applied for the skew correction, since the minimum correction amount is the block size, for example the image of FIG. 13(a) is corrected to be the image of FIG. 13(b), and continuity of the image is lost and image quality is extremely degraded.

According to the technology described in JPA2006-203710, since the relative position of each block is shifted by the unit of one pixel and rearranged on the memory, the minimum correction amount becomes one pixel, however, a smaller amount correction than the one pixel unit is not possible, which causes deterioration of the image quality. Further, since the block size changes according to the angle of inclination, the processing becomes complicated. In cases where the block size is relatively small, the compression rate is lowered, and when the block size becomes large, the image deterioration increases due to irreversible compression. Moreover, since the relative position of each block is shifted and rearranged on the memory, an equivalent memory area to shaded area A in FIG. 6(a) is needed, which raises a problem of increasing cost of the apparatus.

An object of the present invention is to solve the above problems, and to provide an image forming apparatus which can correct image skew with a relatively small required amount of memory, and an image forming apparatus which ensures less image deterioration at the time of skew correction.

SUMMARY

To achieve at least one of the abovementioned objects, an apparatus reflecting one aspect of the present invention is an image processing apparatus for correcting a dislocation of an image in a second direction wherein pixels are arranged in a first direction and in a second direction perpendicular to the first direction, the apparatus including:

a shift amount calculation section which breaks down a correction amount of the image of each pixel in the second direction into a first shift amount with a unit having a size of a prescribed block in the second direction, a second shift amount with a unit of the pixel, the second shift amount being less than the size of the block in the second direction, and a third shift amount being less than the size of the pixel;

a minimal shift section which shifts the image data of each pixel by the third shift amount in the second direction;

a pixel unit shift section which shifts the image data of each pixel by the second shift amount in the second direction; and a block unit shift section which shifts the image data of each pixel by the first shift amount in the second direction, in the process of executing compression and storage processing of the image data in the unit of the block, and executing arranging processing of the image data on a memory with the unit of the block after reading-out the compressed image data from the memory and expanding the compressed image data.

BRIEF DESCRIPTION OF THE DRAWINGS

These and other objects, advantages and features of the invention will become apparent from the following description thereof taken in conjunction with the accompanying drawings in which:

FIGS. 3(a) and 3(b) are schematic diagrams showing examples of an input image versus an output image to and from a sub-scanning shift section;

FIG. 5 is a schematic diagram showing an example of shift processing by a minimal shift section for a shift of less than the size of a pixel;

FIGS. 7(a) to 7(d) are schematic diagrams showing concepts of processing for a pixel unit shift and a block unit shift;

FIGS. 13(a) and 13(b) are schematic diagrams showing an example where an image inclination is corrected by changing the arrangement of blocks.

DETAILED DESCRIPTION OF THE PREFERRED EMBODIMENTS

Figure 1:
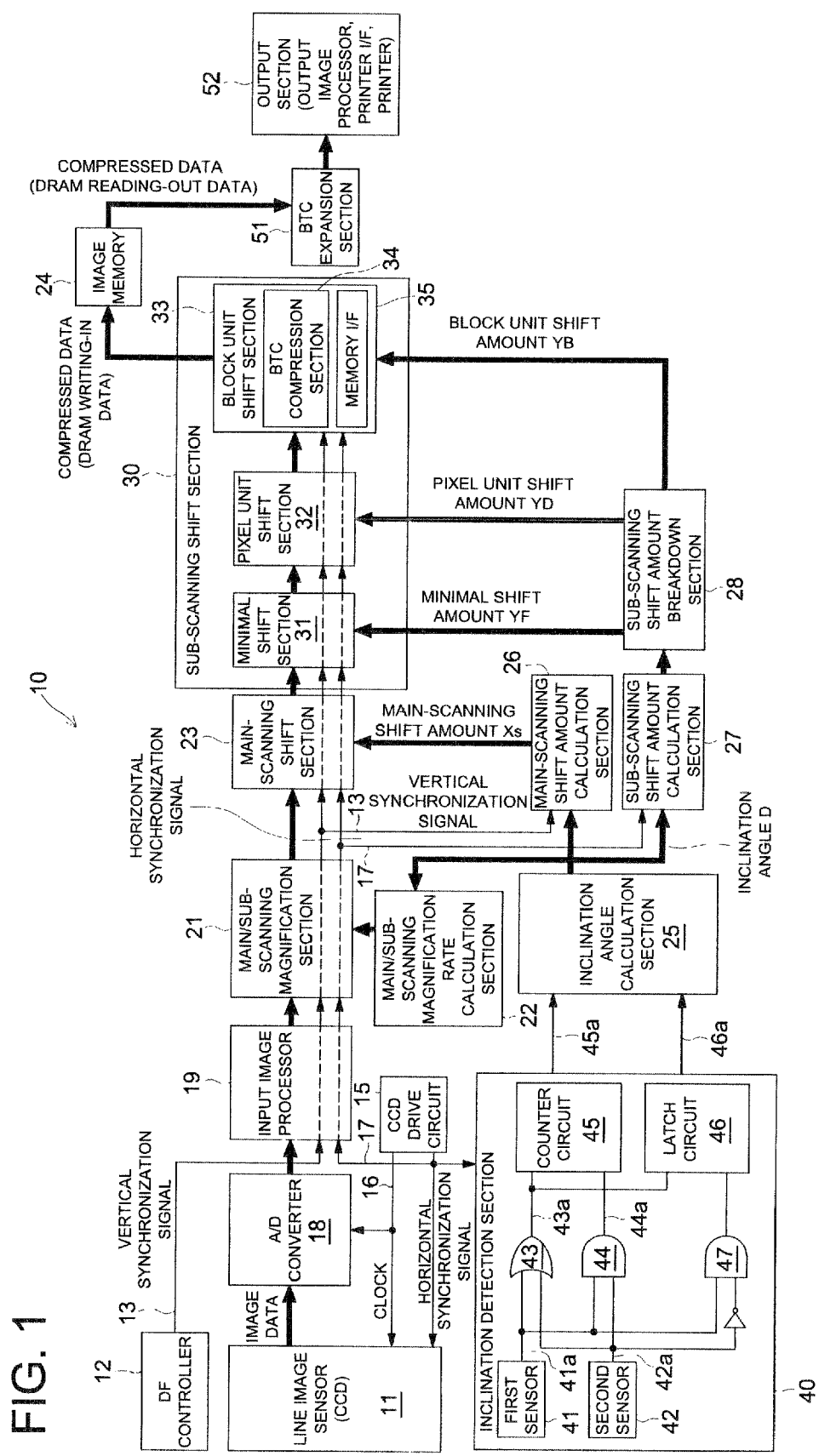
FIG. 1 is a block diagram showing a configuration of the main part of an image processing apparatus relating to the first embodiment of the present invention.

Hereinafter, various embodiments of the present invention will be described by referring to the drawings.

First Embodiment

FIG. 1 shows a configuration of the main part of image processing apparatus 10 relating to the first embodiment of the present invention. Image processing apparatus 10 is configured as a digital multifunctional peripheral which is provided with a copying function to read an original document by a scanner and form a copy image on a recording sheet and output it, a printer function, a facsimile function, and the like. FIG. 1 shows a processing path of image data and its peripheral circuits, in image processing apparatus 10.

An original document is conveyed by an automatic document feeding apparatus (not illustrated), and the image of the original document is read-out by line image sensor 11 provided in the course of the conveying path with a moving document reading system, so to speak Namely line image sensor 11 has the length of one line in main-scanning direction X (the first direction) perpendicular to sub-scanning direction Y (the second direction) which being the direction of original document conveyance, and line image sensor 11 repeats reading operations by a unit of one line while the original document passes over the light receiving section of line image sensor 11, thus the original document is read-out two-dimensionally. For example, line image sensor 11 is configured as a CCD (Charge Coupled Device).

DF controller 12 has a function to control operations of the automatic document feeder. DF controller 11 outputs vertical synchronization signal 13 showing the period during which the moving document passes through line image sensor 11 in the automatic document feeder (the period is an effective period for the original document being read-out).

CCD drive circuit 15 is a circuit which provides, to line image sensor, clock signal 16 indicating output timing with the pixel units, and horizontal synchronization signal 17 indicating output timing with the line units. A/D converter 18 converts an analogue image outputted by line image sensor 11 into multi-valued digital image signals. Input image processor 19 applies processing, such as shading processing and gradation correction, onto digital image signals inputted from A/D converter 18.

Main/sub-scanning magnification section 21 performs a function of varying magnification rates of the image in the main-scanning direction and the sub-scanning direction, by applying enlargement/reduction processing in the main-scanning direction and the sub-scanning direction to the image data inputted from input image processor 19.

The image data outputted from main/sub-scanning magnification section 21 is stored into image memory 24 after successively passing through main-scanning shift section 23 and sub-scanning shift section 30. Main-scanning shift section 23 executes a function of shifting in the main-scanning direction of the inputted image data of each line. Sub-scanning shift section executes a function of shifting in the sub-scanning direction of the image data inputted from main-scanning shift section 23. By the combination of the main-scanning shift and the sub-scanning shift, the inclination of the image is corrected. Further any magnification change (apt to be enlarged) of the image caused by these shift is canceled and compensated by the magnification processing (or reduction processing) by main/subscanning magnification section 21.

Sub-scanning shift section 30 is provided with minimal shift section 31 to which the image data is inputted from main-scanning shift section 23, pixel unit shift section 32 to which the image data passed through minimal shift section 31 is inputted, and block unit shift section 33 to which the image data passed through pixel unit shift section 32 is inputted. Block unit shift section 33 is provided with BTC compression section 31 which divides the image data into each block unit (for example, a block of 4×4 pixels) and compresses the divided image data, and memory I/F (Interface) 35 which controls the storage of compressed image data into image memory 24.

Block unit shift section 33 controls of the shift with units having a size of the block in the sub-scanning direction (block unit shift), pixel unit shift section 32 controls of the shift with units having a size of the pixel, being less than the size of the block, in the sub-scanning direction, and minimal shift section 31 takes controls of the shift with units less than the size of the pixel.

BTC compression section 34 compresses the image data with a compression system called BTC (Block Truncation Coding) system. In the BTC system, an image is divided into a block of prescribed pixels, and each block is expressed with an index indicating the gradation distribution range of each pixel in the block (for example, an intermediate value of the gradation distribution range and width of the range), and code data which expresses a gradation value of each pixel in the block by quantizing the value with a gradation number less than the gradation number of the original image data in the gradation distribution range. As for the compression system, systems such as JPEG (Joint Photograph Experts Group) also work, not being restricted to the BTC compression system.

Inclination detection section 40 is a circuit for detecting the inclination angle of the original document conveyed by the automatic document feeder (not illustrated). Inclination detection section 40 is configured with first sensor 41 and second sensor 42, each being arranged with an interval in the width direction of the conveyance path (main-scanning direction), counter circuit 45, and latch circuit 46.

First sensor 41 and second sensor 42 are preferably arranged at the portions near both end portions in the width direction of the original document. Output signal 41a of first sensor 41 and output signal 42a of second sensor 42 are usually at a low level, and changes to a high level during the period when the sensors detect the original document being conveyed. When either first sensor 41 or second sensor 42 detects the original document first, OR circuit 43 outputs start signal 43a, and after that, when both first sensor 41 and second sensor 42 detect the original document, AND circuit 44 outputs stop signal 44a.

Into counter circuit 45, inputted are horizontal synchronization signal 17, start signal 43a, and stop signal 44a, and said counter circuit 45 counts the number of horizontal synchronization signal 17 inputted between the input of start signal 43a and the input of stop signal 44a, and outputs angle determination signal 45a indicating the count result.

The output of AND circuit 47 becomes to high level when start signal 43a is outputted and first sensor 41 detects the original document first, and becomes to low level when second sensor 42 detects the original document first. Latch circuit 46 preserves the output value of AND circuit 47 at the time when start signal 43a is outputted, and outputs right/left determination signal 46a.

To inclination angle calculation section 25, angle determination signal 45a and right/left determination signal 46a are inputted. Inclination angle calculation section 25 calculates inclination angle D from the number of lines indicated by angle determination signal 45a, the distance between first sensor 41 and second sensor 42 (which being predetermined), and right/left determination signal 46a.

Inclination angle D calculated by inclination angle calculation section 25 are inputted respectively to main/sub-scanning magnification rate calculation section 22, main-scanning shift amount calculation section 26, and sub-scanning shift amount calculation section 27.

Main-scanning shift amount calculation section 26 obtains the position in the sub-scanning direction of the line to be processed (processing line) by main/sub-scanning magnification section 21 based on vertical synchronization signal 13. For example, main-scanning shift amount calculation section 26 obtains the position in sub-scanning direction by counting horizontal synchronization signal 17 from the time of change in vertical synchronization signal 13. Then, from the position in the sub-scanning direction and inclination angle D, main-scanning shift amount calculation section 26 calculates the shift amount in the main-scanning direction (main-scanning shift amount Xs) required to correct image inclination for the line being processed, and provides it to main-scanning shift section 23.

Sub-scanning shift amount calculation section 27 calculates a sub-scanning shift amount Ys required for correcting the image inclination indicated by the inclination angle, and provides it to sub-scanning shift amount breakdown section 28.

Sub-scanning shift amount breakdown section 28 breaks down sub-scanning shift amount Ys obtained by sub-scanning shift amount calculation section 27 into a block unit shift amount having a unit shift amount (block unit shift amount YB, being a first shift amount) equal to the size of the block in the sub-scanning direction, a pixel unit shift amount (YD, being a second shift amount) having a unit shift amount smaller than the size of the block in the sub-scanning direction, and a shift amount (minimal shift amount YF, being a third shift amount) being smaller than the size of the pixel. Then sub-scanning shift amount breakdown section 28 respectively provides block unit shift amount YB to block unit shift section 33, provides pixel unit shift amount YD to pixel unit shift section 32, and provides minimal shift amount YF to minimal shift section 31.

Main/sub-scanning magnification rate calculation section 22 obtains the magnification rate in the main-scanning direction and the magnification rate in the sub-scanning direction for compensating the image magnification change caused by the correction of the image inclination indicated by inclination angle D, the correction having been executed by the shift processing of main-scanning shift section 23 and sub-scanning shift section 30. The obtained magnification rates are then provided to main/sub-scanning magnification section 21.

BTC expansion section 51 reads out and expands the compressed data stored in image memory 24. The expanded image data is inputted to output section 52. Output section 52 is configured with an output image processor, printer I/F, and a printer section. The printer section forms an image corresponding to the inputted image data on a recording sheet to output.

Next, operations of each section relating to the main-scanning shift and the sub-scanning shift are described in more detail.

Figure 2:
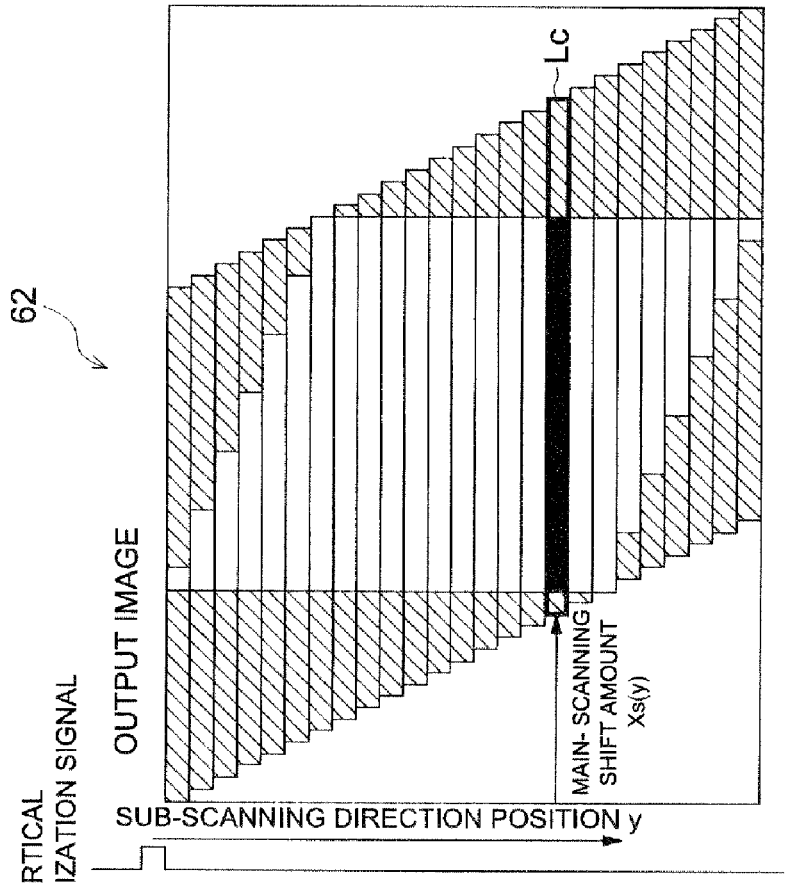
FIGS. 2(a) and 2(b) are schematic diagrams showing examples of an input image versus an output image to and from a main-scanning shift section.
Figure 2:
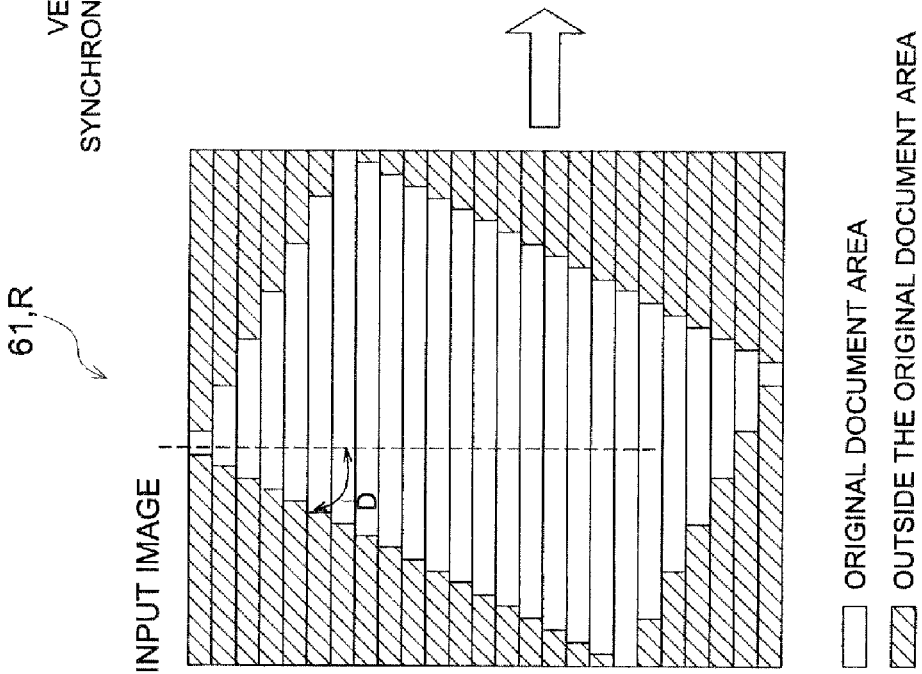

FIGS. 2(a) and 2(b) schematically shows input image 61 inputted to main scanning shift section 23 versus output image 62 processed and outputted by main scanning shift section 23. Here, for easy understanding of explanation, each line is illustrated with a wide-width line. In the drawing, the white area in readout area R represents an original document area, and the shaded area represents outside the original document area.

The shift amount for each line in the main-scanning direction required for correcting the inclination of the original document area in input image 61 of FIG. 2(a) is calculated based on inclination angle D of the original document and position of each line in the sub-scanning direction. For example, main-scanning shift amount Xs(y) for processing line Lc in the main-scanning direction at position y in the sub-scanning direction of FIG. 2(b) can be obtained by: $Xs(y) = y \times \tan D$. In this way, main-scanning shift amount calculating section 26 obtains main-scanning shift amount Xs for each line. Main-scanning shift section 23 shifts the image data of each line in the main-scanning direction in accordance with main-scanning shift amount Xs obtained by main-scanning shift amount calculation section 26, and creates output image 62 as shown in FIG. 2(b).

FIGS. 3(a) and 3(b) are schematic diagrams showing examples of an input image (FIG. 3(a)) versus output image (FIG. 3(b)) to and from the sub-scanning shift section 30. In FIGS. 3(a) and 3(b), an image is shown by being divided to each line Lv of sub-scanning direction. In the drawings, the white area in input image 64 represents an original document area, and the shaded area represents the area outside the original document area.

Sub-scanning shift amount Ys required for correcting the dislocation in the sub-scanning direction of the original document area in input image 64 of FIG. 3(a) varies dependently on the position x in the main-scanning direction as shown in FIG. 3(b). Then, sub-scanning shift section 30 obtains the present position x in the main-scanning direction from horizontal synchronization signal 17 and clock signal 16, and calculates sub-scanning shift amount Ys(x) of the target image for each position x in the main-scanning direction from the obtained position x in the main-scanning direction and inclination angle D.

Figure 4:
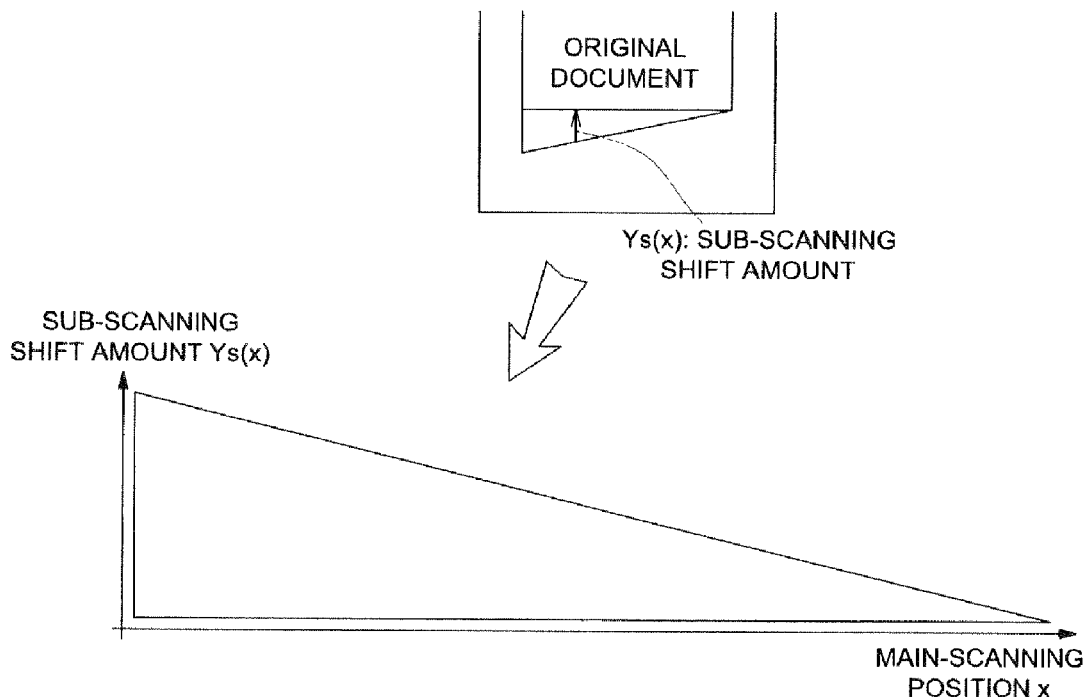
FIGS. 4(a) and 4(b) are schematic diagrams showing a break-down example of shift amount by a break-down section of sub-scanning shift amount.
Figure 4:
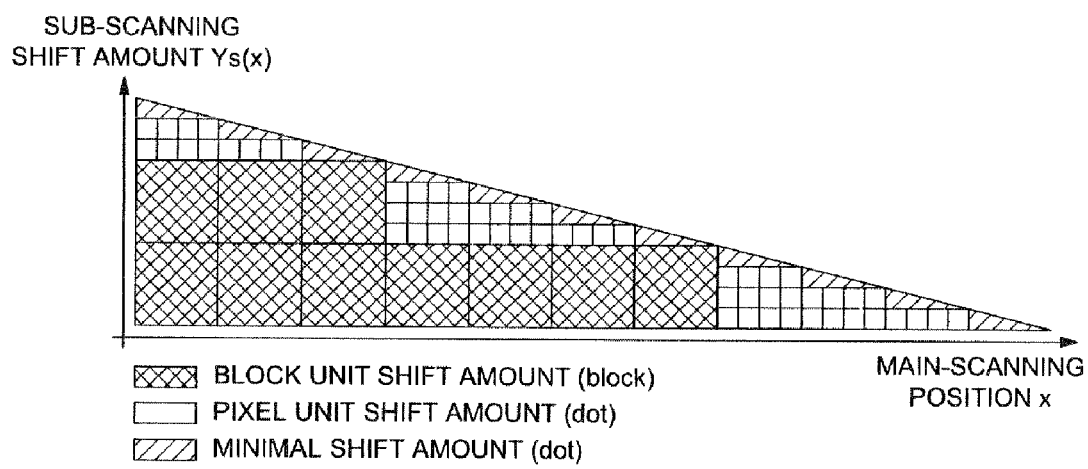

FIGS. 4(a) and 4(b) are schematic diagrams showing a break-down example of shift amount by the breakdown section of sub-scanning shift amount 28. As shown in FIG. 4(a), sub-scanning shift amount Ys at each position x in the main-scanning direction is assumed as Ys(x). And, the block size in the sub-scanning direction is assumed as 4 pixels. In this case, block unit shift amount YB(x) at main-scanning position x becomes. YB(x)=Int(Ys(x)/4), where a unit of YB(x) is a block. Pixel unit shift amount YD(x) at main-scanning position x becomes: YD(x)=Int(Ys(x)−4×YB(x)), where a unit of YD(x) is a pixel. Then minimal shift amount YF(x) at main-scanning position x becomes:

YF(x)=Ys(x)−4×YB(x)−YD(x), where a unit of YF(x) is a pixel. Wherein, Int ($\alpha$) indicates the integer component of $\alpha$.

Namely, sub-scanning shift amount Ys(x) at main-scanning position x is firstly divided into the block unit, and the number of divided blocks is calculated as block unit shift amount YB(x). Next, the remainder obtained by subtracting the number of pixels corresponding to the divided blocks from sub-scanning shift amount Ys(x) is divided by the unit of pixels (integer) to obtain the number of pixels which is designated as pixel unit shift amount YD(x). At the last, the remainder obtained by subtracting the number of pixels corresponding to the block unit shift amount and the number of pixels corresponding to the pixel unit shift amount from sub-scanning shift amount Ys(x) is designated to minimal shift amount YF(x).

FIG. 4(b) illustrates, by an example, the condition where sub-scanning shift amount Ys is divided into block unit shift amount YB, pixel unit shift amount YD and minimal shift amount YF. For example, in a case where the block size in the sub-scanning direction is 4 pixels and sub-scanning shift amount Ys is 13.4 pixels, Ys is divided into YB=3 (namely to be shifted 3 blocks in the sub-scanning direction), YD=1 (namely to be shifted 1 block in the sub-scanning direction), and YF=0.4 (to be shifted 0.4 block in the sub-scanning direction).

FIG. 5 illustrates by an example the shift processing of less than one pixel by minimal shift section 31. The shift of less than one pixel is realized by executing an interpolation processing by estimating a pixel corresponding to the shift amount from peripheral pixels in the sub-scanning direction. As the interpolation processing, a cubic convolution method referring to 4 peripheral pixels, or a linear convolution method referring to 2 peripheral pixels can be utilized. FIG. 5 illustrates the minimal shift by the linear interpolation referring to 2 pixels In the drawing, solid black dots indicate pixel positions before the interpolation, outlined dots indicate the pixel positions after the interpolation and the arrow lines indicate the shift amounts.

Next, the pixel unit shift and the block unit shift will be explained.

Figure 6:
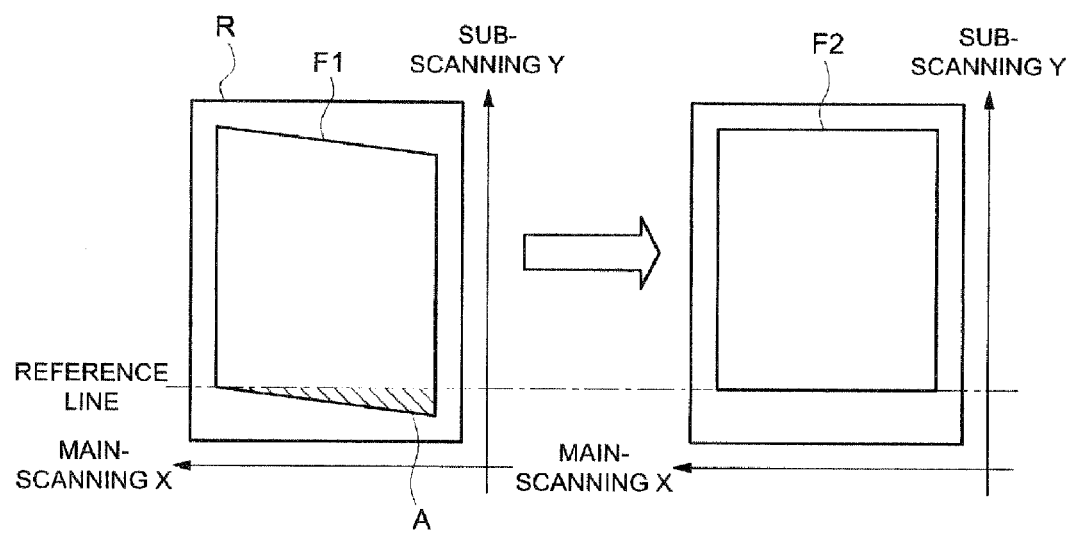
FIGS. 6(a) and 6(b) are schematic diagrams showing example images of before and after the shift in the sub-scanning direction.

Image F1 of FIG. 6(a) is assumed to be corrected to image F2 of FIG. 6(b). FIGS. 7(a) and 7(b) illustrate a concept of the pixel unit shift processing by pixel unit shift section 32. Pixel unit shift section 32 holds seven lines of the image data to which have been applied the minimal shift by minimal shift section 31 with line memory 70, and at position X in the main-scanning direction, selects 4 pixels in accordance with pixel unit shift amount YD(x) out of the 7 pixels arranged in the sub-scanning direction. Each of the selected 4 pixels in the sub-scanning direction is further consecutively arranged in the main-scanning direction to select 4×4 pixel blocks (A3, A4, etc.) which being the subject of BCT compression (FIG. 7(a)) By the above selection processing, the pixel unit shift as shown in FIG. 7(b) is substantially performed.

For example, regarding first row v1 and second row v2 from the right side of A3 block of FIG. 7(a), since each pixel unit shift amount is one pixel, the 4 pixels of the second to fifth from the bottom are selected, and regarding third row v3 and fourth row v4, since each pixel unit shift amount is two pixels, 4 pixels of the third to sixth from the bottom are selected.

Block unit shift section 33 applies BTC compression (other compression means such as JPEG can also be utilized) with the unit of block to each block selected by pixel unit shift section 32 (FIG. 7(c)). When storing compressed data a3, a4, ... into image memory 24, memory I/F 35 sets addresses in the memory based on the block unit shift amount YB provided from subscanning shift amount breakdown section 28 (FIG. 7(d)). Each block data a3, a4, ... is stored in image memory 24, being arranged corresponding to each block arrangement in a single page image which will be configured after the compressed data of each block being expanded.

Figure 8:
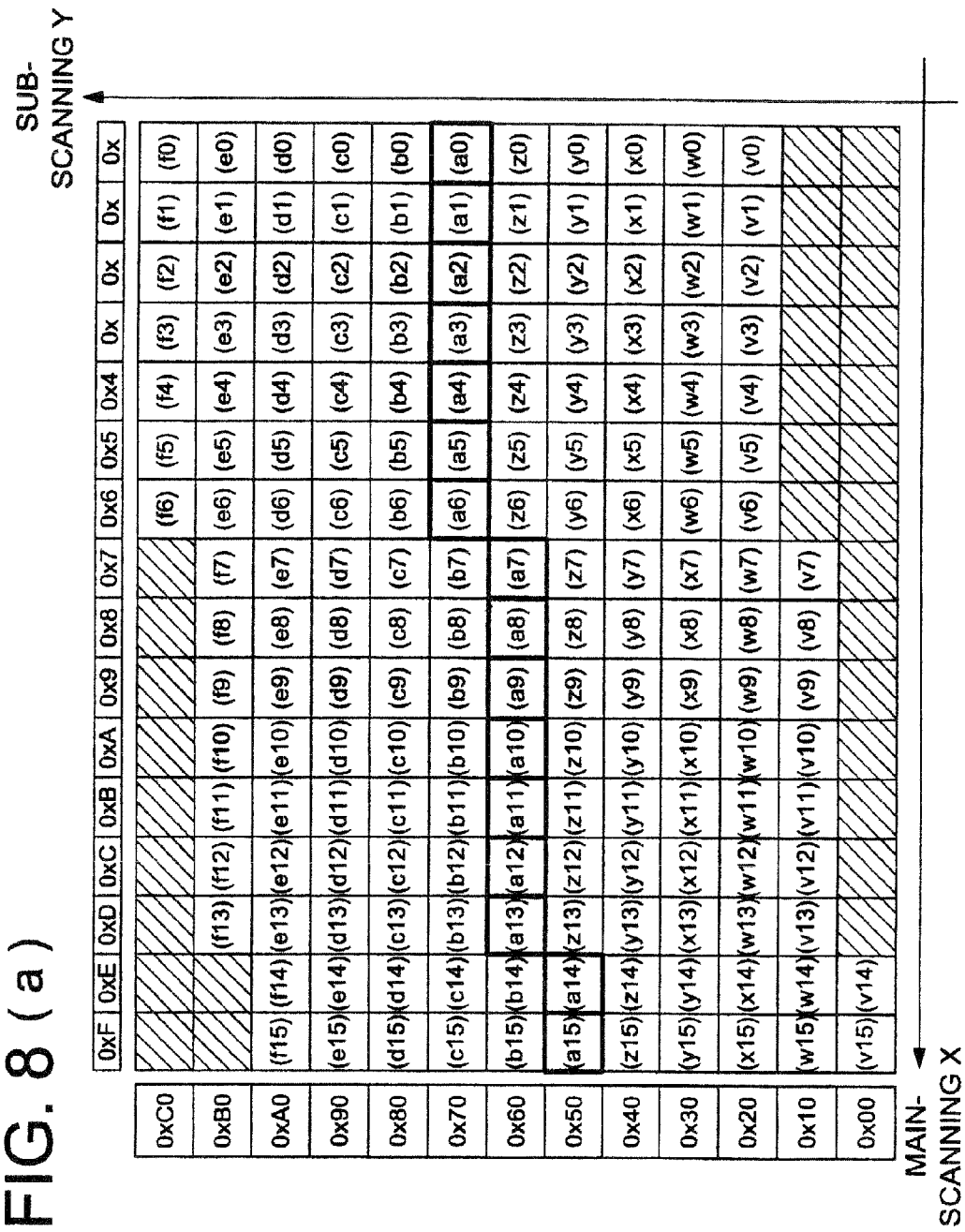
FIGS. 8(a) and 8(b) are schematic diagrams respectively showing an arrangement of the compressed data which have been shifted with units of one block and stored in an image memory, and the order of reading out the data.
Figure 8B:
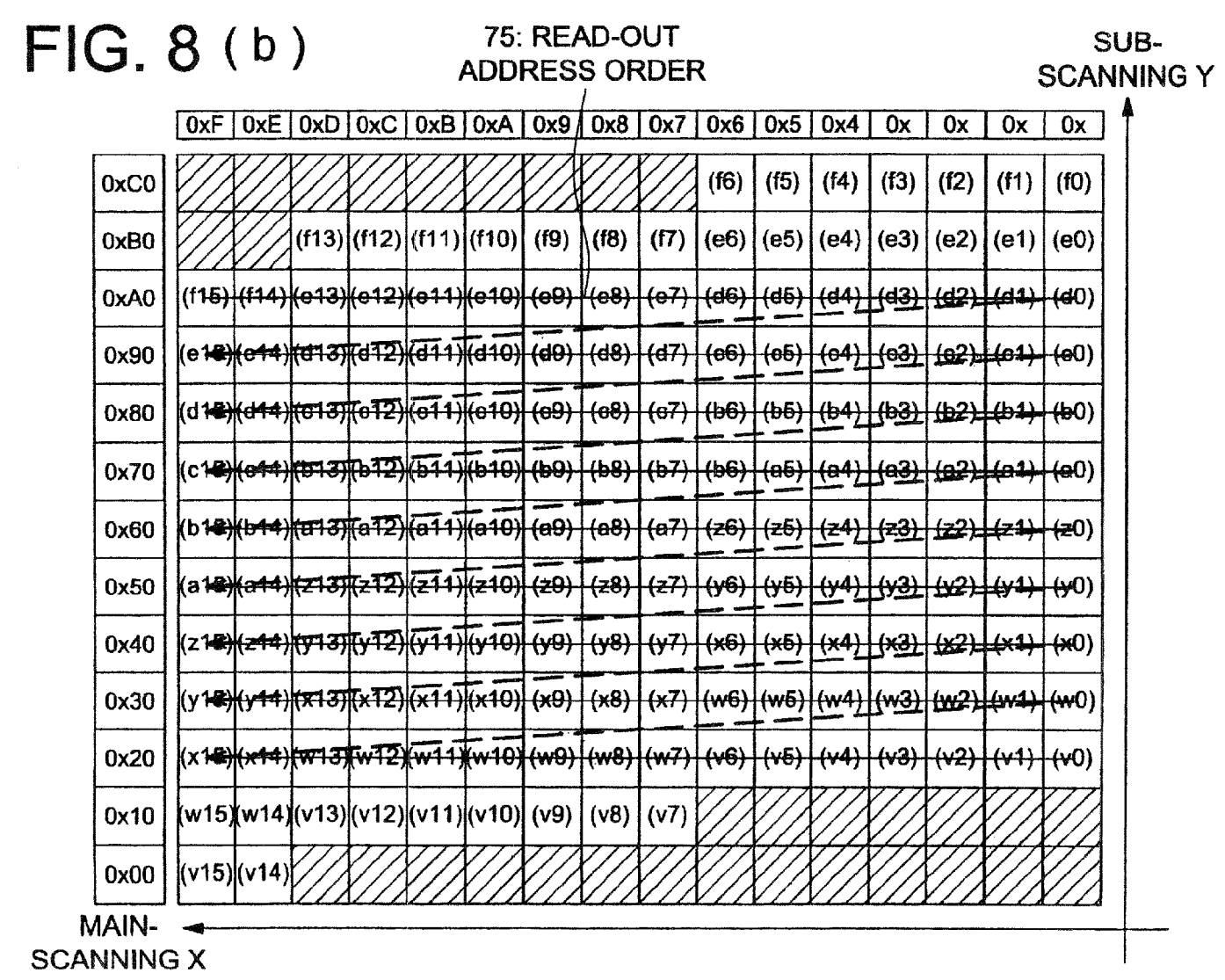

In FIG. 7(d), compressed data a7-a10 of A7-A10 blocks are arranged by shifting one block in the sub-scanning direction compared to compressed data a3-a6 of A3-A6. FIG. 8(a) shows the storage state of the compressed data in image memory 24 over a wider area. Compressed data a0-a15 of each concerned 4 lines including A3-A10 shown in FIG. 7(d) are shown as a group of blocks enclosed by bold lines in FIG. 8(b).

Reading out of the compressed data stored in image memory 24 is executed in the order shown by an arrowed line 75. By this, the image data of each block obtained by expanding the compressed data is arranged at a position (in a page) corresponding to the arrangement of the compressed data in image memory 24. Accordingly, when storing the compressed data into image memory 24, by shifting the arrangement of the compressed data based on block unit shift amount YB, the block unit shift on the image after expansion is realized.

Figure 9:
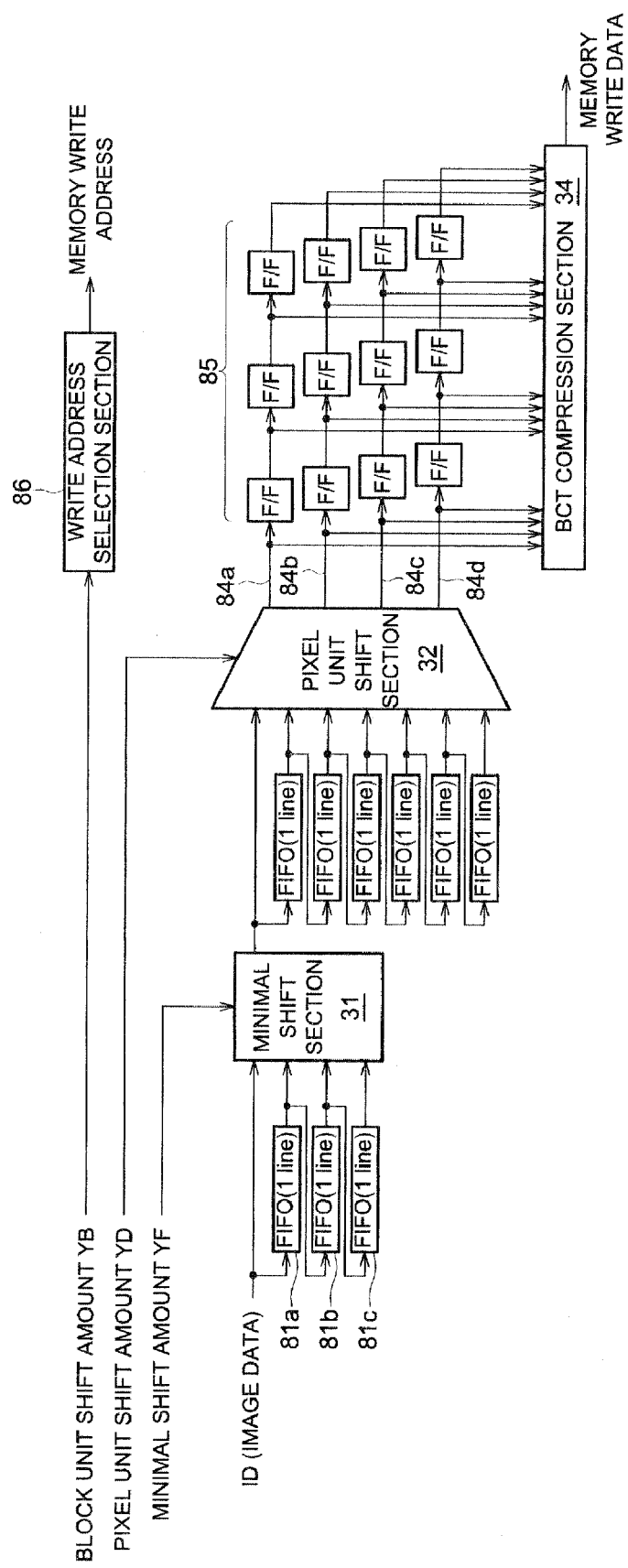
FIG. 9 is a block diagram showing a circuit structure of the sub-scanning shift section.

FIG. 9 shows in more detail a circuit configuration of sub-scanning shift section 30. In front of minimal shift section 31, provided are FIFO (First-In First-Out) memories 81a, 81b, 81c, which configure line memories for three lines. Inputted to minimal shift section 31, are image data for 4 lines totaling of a target line and, 1 line before, 2 lines before, and 3 lines before the target line are inputted by being aligned in parallel. Minimal shift section 31 executes an interpolation processing based on these image data of 4 lines inputted in parallel.

In front of pixel unit shift section 32, FIFO memories of 82a-82f, configuring line memories for 6 lines, are provided. To pixel unit shift section 32, image data for 7 lines totaling of a target line, 1 line before, 2 lines before, 3 lines before, 4 lines before, 5 lines before, and 6 lines before the target line are inputted by being aligned in parallel. Pixel unit shift section 32 selects 4 pixels of the positions corresponding to pixel unit shift amount YD(x) out of the 7 pixels inputted in parallel being aligned in the sub-scanning direction, and sequentially outputs first line data 84a for BTC compression, second line data 84b for BTC compression, third line data 84c for BTC compression, and fourth line data 84d for BTC compression. subsequent to pixel unit shift section 32, flip-flop circuits 85, connected as a three-step cascade, are provided, corresponding to each line of first line data 84a for BTC compression, second line data 84b for BTC compression, third line data 84c for BTC compression, and fourth line data 84d for BTC compression. Image data for 16 pixels (4×4 pixels) by 4 clock signals are inputted into BTC compression section 34 as the image data for one block which will be a target of BTC compression Write address selection section 86 creates an address (memory address) to be used when the compressed data (memory write data) outputted by BTC compression section 34 is stored into image memory 24.

According to the first embodiment described above, image processing apparatus 10 detects the inclination angle of the original document, obtains main-scanning shift amount Xs and sub-scanning shift amount Ys which are required to correct the inclination, and executes the main-scanning shift and the sub-scanning shift based on these shift amounts Xs and Ys, whereby, by the use of relatively easy executable shift processing, an inclination corrected image can be obtained.

Further, main/sub-scanning magnification section 21 varies magnification rates of the image so that the magnification change caused by the shift processing is cancelled, thus the image corrected in inclination and having no magnification change can be obtained.

Further, sub-scanning shift amount Ys is brokendown into block unit shift amount YB, pixel unit shift amount YD, and minimal shift amount YF, after which the block unit shift is executed by an arrangement control of the BTC compressed data. Thus, with regard to the un-compressed image data, only the shift processing of less than one block size, is required, shift amount in un-compressed state decreases, which enables to decrease the memory capacity to be kept for the shift. For example, in the case of processing the compression by the use of 4×4 pixel block processing, the substantially increased memory capacity by the installation of the inclination correction function will be the memory for only 2.5 lines (in the case where a linear interpolation processing is utilizes as the minimal shift processing).

Further, after the minimal shift by minimal shift section 31 and pixel unit shift by pixel unit shift section 32 are simultaneously executed in parallel to the operation of reading the original document, the image data is stored into image memory 24, thus the correction processing is easily realized at high speed. Further, since the block unit shift is executed when storing the compressed data after the compression processing having been applied, the data amount to be processed in the block unit shift processing decreases, which enables to decrease the memory capacity for image data storage and to increase the throughput of the memory interface.

Yet further, since the sub-scanning shift amount can be changed at an arbitrary position in the main-scanning direction (namely the pixel unit shift amount can be changed even outside the block boundary), the shift corresponding to arbitrary inclination angle can be executed at the state of fixed block size. Further, even the shift of less than one pixel is executed, correction of higher accuracy is enabled and image deterioration due to the correction is suppressed.

Second Embodiment

Figure 10:
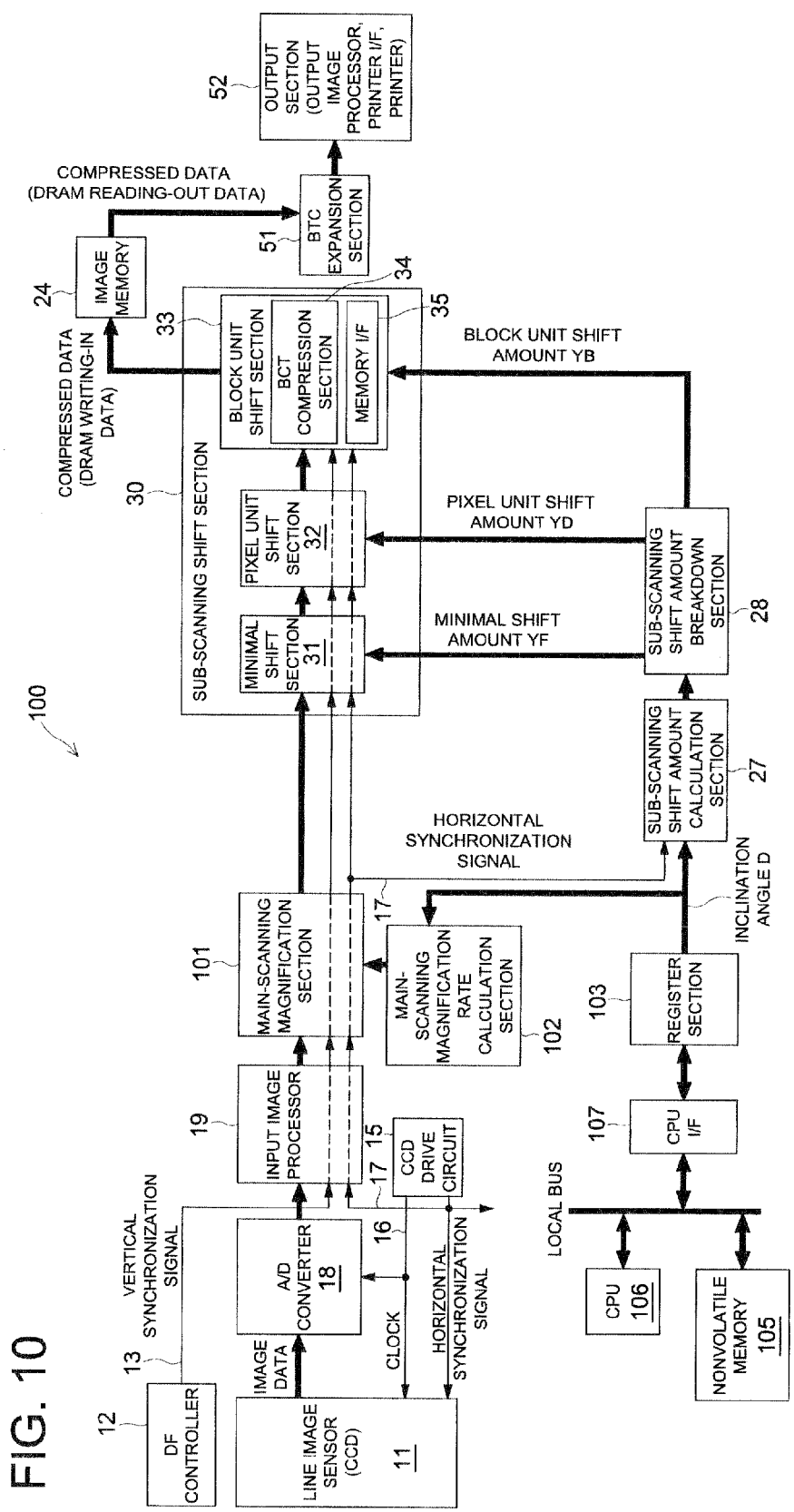
FIG. 10 is a block diagram showing a configuration of the main part of an image processing apparatus relating to the second embodiment of the present invention.

FIG. 10 shows a configuration of image processing apparatus 100 relating to the second embodiment of the present invention. In the first embodiment, the inclination of the image is corrected by executing the shift in the main-scanning direction, as well as the shift in the sub-scanning direction, though in image processing apparatus 100, of the second embodiment, executes a shift in the sub-scanning direction without executing a shift in the main-scanning direction. Image processing apparatus 100 is configured to correct a skew of installation angle of line image sensor 11 by executing the shift in the sub-scanning direction. Incidentally, to the same parts as that of image processing apparatus 10 of the first embodiment, the same sign is attached, and accordingly the explanation thereof will be omitted.

Image processing apparatus 100 does not execute a main-scanning shift, thus has main-scanning magnification section 101 for executing only the magnification in the main-scanning direction in place of main/sub-scanning magnification section 21 provided in image processing apparatus 10, and has main-scanning magnification rate calculation section 102 for calculating only the magnification rate in the main-scanning direction, in place of main/sub-scanning magnification rate calculation section 22 of image processing apparatus 10. Main-scanning shift section 23 and main-scanning shift amount calculation section 26 are not provided in image processing apparatus 100.

Further, neither inclination detection section 40 for detecting the inclination angle of the original document or inclination angle calculation section 25 are provided. In place of these, information representing the skew angle (inclination angle D) of line image sensor 11 is obtained from register section 103. Wherein configured is such that the inclination angle of line image sensor is measured at the shipping step in manufacturing line of the apparatus, and the inclination angle information representing this inclination angle is stored in nonvolatile memory 105 installed in the digital MFP (multi functional peripheral).

When reading out the image, CPU (Central Processing Unit) 106 reads out the inclination angle information from nonvolatile memory 105, and stores it in register section 103 through CPU I/F 107. Inclination angle D represented by the inclination angle information is outputted from register section 103 to sub-scanning shift calculation section 27 and main-scanning magnification rate calculation section 102.

Based on inclination angle D inputted from register section 103, main-scanning magnification calculation section 102 calculates the magnification rate in the main-scanning direction to compensate for the magnification change amount which being caused in the case where the inclination angle is corrected by the shift in the sub-scanning direction, and provides it to main-scanning magnification section 101. Based on the main-scanning magnification rate provided from main-scanning magnification calculation section 102, main-scanning magnification section 101 changes magnification of the image data inputted from input image processor 19, based on the main-scanning magnification rate provided from main-scanning magnification calculation section 102.

Since the shift operation in the sub-scanning direction based on inclination angle D is the same as that of the first embodiment, the explanation will be omitted.

As described above, in image processing apparatus 100 of the second embodiment, since the skew of line image sensor 11 is corrected by the image shift in the sub-scanning direction, an image without distortion caused by the skew can be obtained even in cases where the accuracy of installation angle adjustment is not sufficiently high.

Third Embodiment

In the first and second embodiments, described is the correction of a reading-out system (the skew of line image sensor 11, and inclination of the original document). In image processing apparatus 200 relating to the third embodiment, correction of the skew caused by a writing system is executed For example, the image distortion caused by the skew of a print head in a laser printer is corrected.

Figure 11:
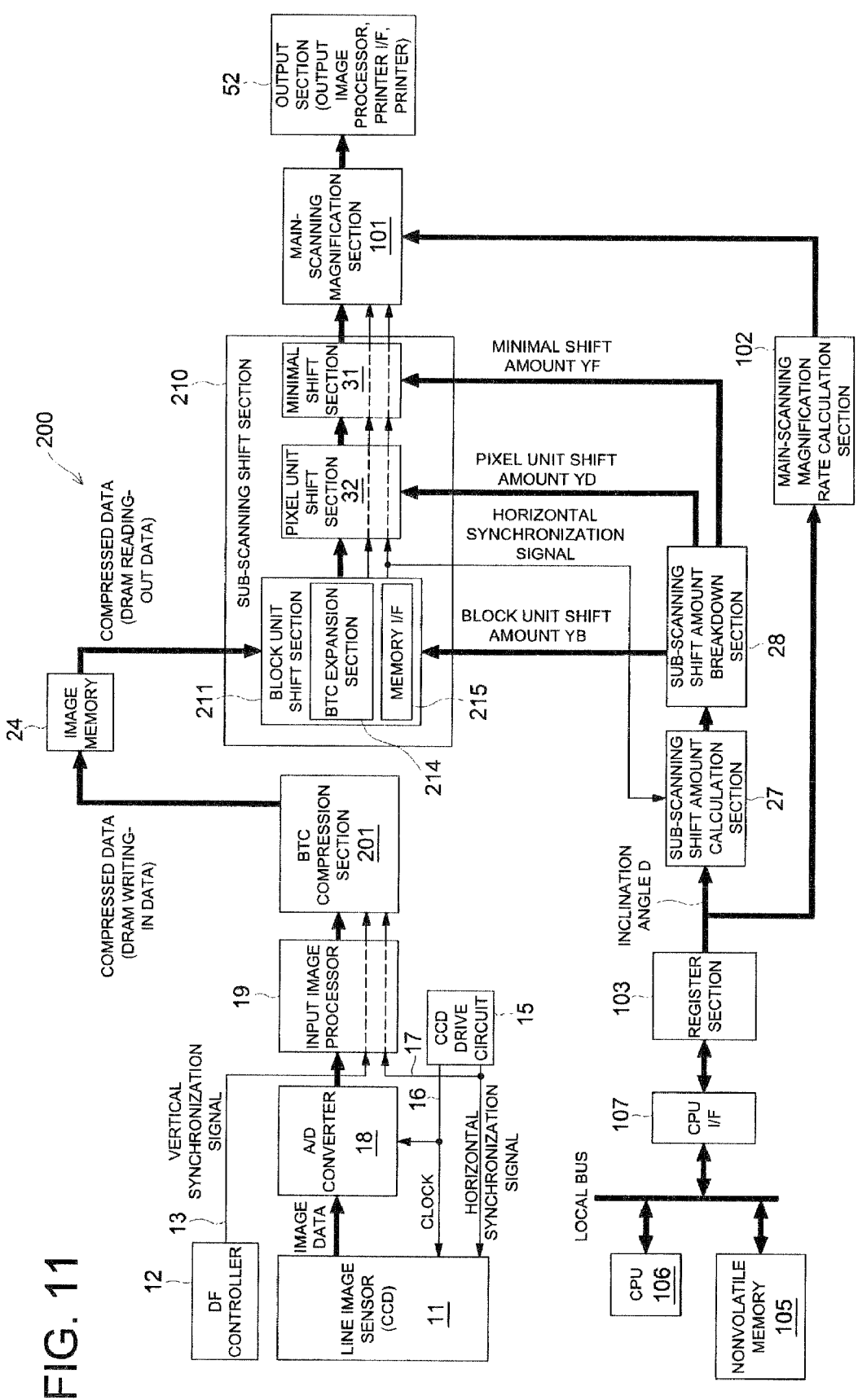
FIG. 11 is a block diagram showing a configuration of the main part of an image processing apparatus relating to the third embodiment of the present invention.

FIG. 11 shows a configuration of the main part (the part relating to the correction of the write-in system) of image processing apparatus 200 relating to the third embodiment. To the same part as that of image processing apparatus 10 of FIG. 1 or image processing apparatus 100 of FIG. 10, the same designation is attached, and accordingly the explanation thereof will be omitted.

In image processing apparatus 200, the image data outputted from input image processor is directly compressed by BTC compression section 201 and stored into image memory 24. In nonvolatile memory 105, stored is the inclination angle information representing an inclination angle of the write-in system (such as a print head) measured such as at a shipping step in manufacturing line of the apparatus.

The shift processing in the sub-scanning direction for correcting the skew of write-in system is executed in the process of expanding and outputting the compressed data stored in image memory 24 to output section 52. Wherein, the shift processing is executed in the order of the block unit shift, then the pixel unit shift, and finally the minimal shift.

Sub-scanning shift section 210 is provided with block unit shift section 211, pixel unit shift section 32, and minimal shift section 31. Block unit shift section 211 has BTC expansion section 214 to expand the compressed data compressed by BTC compression algorithm, and memory I/F 215.

Memory I/F 215 reads out the compressed data of each block from image memory 24, and provides it to BTC expansion section 214. Where, memory I/F is configured to execute the block unit shift by changing the readout order in the case of reading out the compressed data of each block from image memory 24 based on block unit shift amount YB provided from sub-scanning shift amount break-down section 28.

Figure 12:
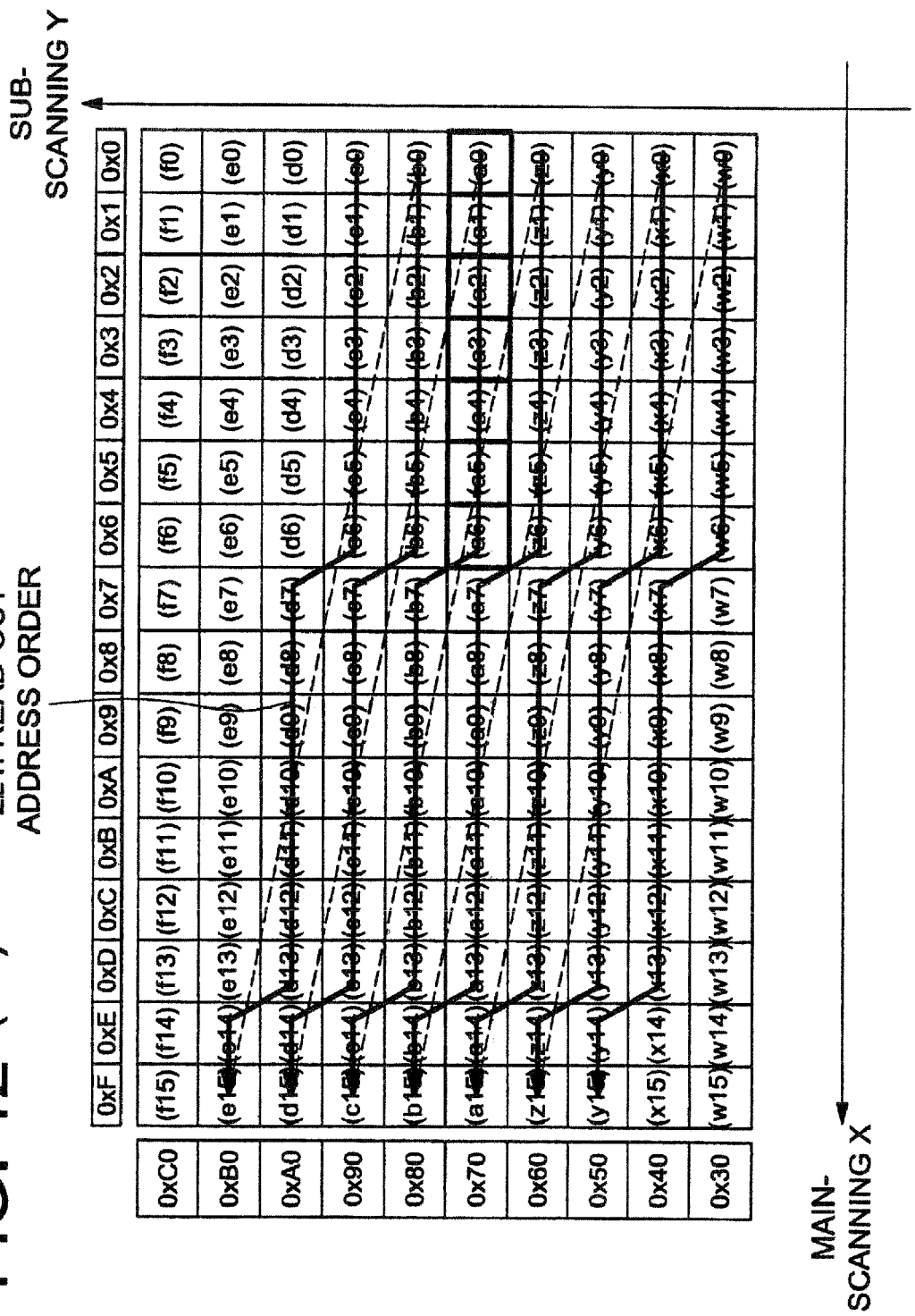
FIGS. 12(a) and 12(b) are schematic diagrams respectively showing an arrangement of the compressed data in a case where the sub-scanning direction shift with the unit of block is executed by a writing-in system, and the order of reading out the data.

FIG. 12(*a*) shows an example of reading out the compressed data by memory I/F 215. By reading out the compressed data of each block in the order shown by arrow line 221, the data of each block in the page after expansion is arranged as shown in FIG. 12(*b*).

The image data obtained at BTC expansion section 214 by expanding the compressed data of each block based on the order given by memory I/F 25 is provided to pixel unit shift section 32 with a block unit. Pixel unit shift section 32 executes shift processing with the unit of a pixel, based on pixel unit shift amount YD provided from sub-scanning shift amount break-down section 28. Minimal shift section 31 executes the shift of less than one pixel for the image data inputted from pixel unit shift section 32, with an interpolation processing, etc., based on minimal shift amount YF provided from sub-scanning shift amount break-down section 28.

Subsequently to minimal shift section 31, main-scanning magnification section 101 is provided. Main-scanning magnification section 101 executes magnification of the image data inputted from minimal shift section 31 based on the magnification rate provided from main-scanning magnification rate calculation section 102, and sends it to output section 52.

In this way, the skew correction of writing system is executed at the time of outputting of the image data, by the order of the block unit shift, then the pixel unit shift, and finally the minimal shift of less than one pixel. By executing the above mentioned image shift in the sub-scanning direction, an image without distortion caused by the skew of the writing system can be obtained even in the case where accuracy of the installation angle adjustment of the print head is not high enough.

Although the embodiments of the present invention are explained by referring to the drawings, concrete configurations are not restricted to those shown in the embodiments, and any changes or additions within the scope of the present invention shall be included in the present invention.

Although in the embodiments, sub-scanning shift amount Ys has been broken down to block unit shift amount YB, pixel unit shift amount YD and minimal shift amount YF, the configuration without executing minimal shift is also possible. For example, sub-scanning shift amount Ys will be broken down to block unit shift amount YB, and pixel unit shift amount YD. In this case, the shift amount less than one pixel may be rounded down or rounded off to be included in the pixel unit shift amount.

The first embodiment is configured that the inclination of the original document in the case of reading the original document by the scanner is corrected, while the configuration is possible where the inclination of recording sheet conveyed in a printer is detected, and an image to be printed on the recording sheet is inclined to correct the inclination of the recording sheet. Namely, with respect to the third embodiment, the other configuration is possible by providing main-scanning shift section 23 subsequently to minimal shift section 31, and further subsequently to it providing main/sub-scanning magnification section 21 in place of main-scanning magnification section 101, and providing main/sub-scanning magnification rate calculation section 22 in place of main-scanning magnification rate calculating section 102. The measurement of inclination of the recording sheet can be executed with the same principle as that of inclination detection section 40 having measured the inclination of original document. Namely, by arranging two sensors in the sheet conveying path with an interval in the width direction of the recording sheet, the inclination angle may be detected from the difference between each passing time over the sensors.

The inclination detection method of original document or recording sheet is not restricted to the method exemplified in the present embodiments. For example, the inclination may be detected from a result of original image analysis. Further, in the case of inputting the image data from an external apparatus in place of reading out the original document, data of the inclination angle may be received from the external apparatus.

Regarding the compression system, any compression system which compresses data by dividing the image in blocks can be utilized not being restricted to the BTC compression or JPEG.

According to the image processing apparatus relating to the present invention, the shift for correcting the image skew is executed by dividing the shift into the block unit shift and the shift of less than the block unit, and in addition to this, the block unit shift is executed in the process of compressing and expanding the image data in block unit, thus the correction of image skew can be executed with decreased memory amount requirement. Further according to the configuration of executing the minimal shift of less than one pixel, image deterioration due to the correction can be suppressed to minimal.

What is claimed is:

1. An image processing apparatus for correcting a dislocation of an image in a second direction wherein pixels are arranged in a first direction and in a second direction perpendicular to the first direction, the apparatus comprising:

a shift amount calculation section which breaks down a correction amount of the image of each pixel in the second direction into a first shift amount with a unit having a size of a prescribed block in the second direction, a second shift amount with a unit of the pixel, the second shift amount being less than the size of the block in the second direction, and a third shift amount being less than the size of the pixel;

a minimal shift section which shifts the image data of each pixel by the third shift amount in the second direction;

a pixel unit shift section which shifts the image data of each pixel by the second shift amount in the second direction; and a block unit shift section which shifts the image data of each pixel by the first shift amount in the second direction, in the process of executing compression and storage processing of the image data in the unit of the block, and executing arranging processing of the image data on a memory with the unit of the block after reading-out the compressed image data from the memory and expanding the compressed image data.

2. The image processing apparatus of claim 1, wherein the shift sections execute the correction on an inputted image data in order of the minimal shift section, the pixel unit shift section and the block unit shift section.

3. The image processing apparatus of claim 1, wherein the shift sections execute the correction on an image data to be outputted, in order of the block unit shift section, the pixel unit shift section and the minimal shift section.

4. The image processing apparatus of claim 1, wherein the compression is executed by a BTC (Block Truncation Coding) compression system.

5. The image processing apparatus of claim 1, wherein the compression is executed by a JPEG (Joint Photograph Expert Group) compression system.

6. The image processing apparatus of claim 1, wherein the shift amount calculation section breaks down the correction amount of the image of each pixel in the second direction into the first shift amount and the second shift amount, instead of breaking down into the first shift amount, the second shift amount, and the third shift amount, and the pixel unit shift section and the block unit shift section correct the dislocation of the image in the second direction without providing the minimal shift.

7. The image processing apparatus of claim 1, wherein the minimal shift section executes the shift of less than one pixel, by utilizing an interpolation processing.

8. The image processing apparatus of claim 1, further comprising a magnification processing section of the first direction which compensates a magnification change caused by the correction of the dislocation of the image in the second direction.

9. The image processing apparatus of claim 1, further comprising a first direction shift section which corrects the dislocation of the image in the first direction, before or after the correction of the dislocation in the second direction, and the image processing apparatus corrects an inclination of the image by combination of the correction of the dislocation in the first direction and the correction of the dislocation in the second direction.

10. The image processing apparatus of claim 9, further comprising a second direction magnification processing section which compensates a magnification change of the second direction caused by the correction of dislocation of the image in the first direction.

* * * * *